Aug. 18, 1925.
H. H. HULSEN ET AL
1,550,213
BACK PRESSURE VALVE
Filed July 11, 1923
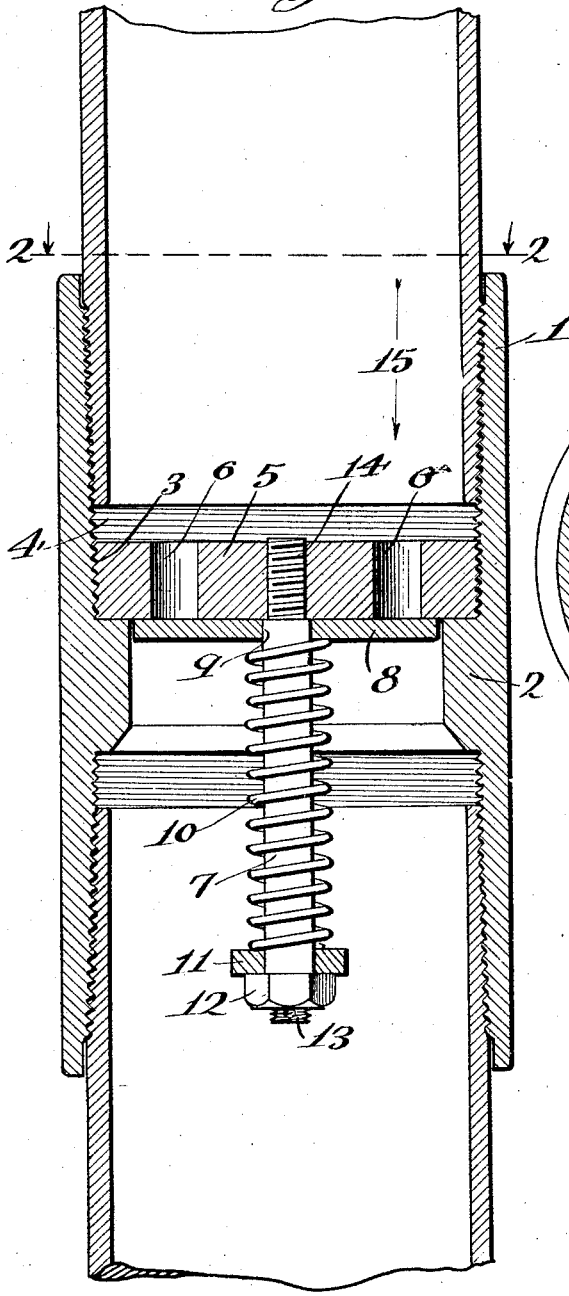
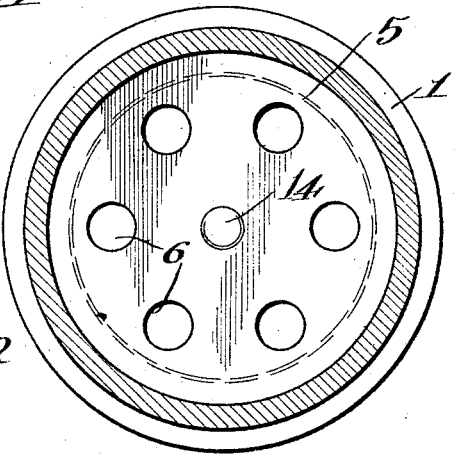
Inventors.
THOMAS A. WILCOX
HENRY H. HULSEN
By Hazard and Miller
Attorneys Patented Aug. 18, 1925.

1,550,213

UNITED STATES PATENT OFFICE.

HENRY H. HULSEN, OF LOS ANGELES, AND THOMAS A. WILCOX, OF SANTA FE SPRINGS, CALIFORNIA.

BACK-PRESSURE VALVE.

Application filed July 11, 1923. Serial No. 650,977.

*To all whom it may concern:*

Be it known that we, HENRY HERBERT HULSEN and THOMAS A. WILCOX, citizens of the United States, residing at Los Angeles, county of Los Angeles, State of California, and Santa Fe Springs, in the county of Los Angeles and State of California, respectively, have invented new and useful Improvements in Back-Pressure Valves, of which the following is a specification.

Our present invention is a back pressure valve; and it is a special object of this invention to provide a simple and reliable valve, of very rugged construction, adapted to be inserted in, for example, a pipe line, such as an oil line, to resist back pressure.

It is an object of this invention to provide a valve which may be interposed in either a horizontal or a vertical or an inclined run of pipe; and which shall be positive in operation, a preferred embodiment of our invention being such as to permit our valve to be used in place of an ordinary pipe coupling.

It is an object of this invention to provide a valve comprising a fixed and apertured seat preferably threaded and secured against a shoulder, this plate being provided with a pin or projection adapted to carry a movable closure plate, a resilient member being secured on said pin in such manner that a considerable pressure may be required to permit an advance of liquid, and in such manner that a return of liquid shall be practically impossible, the tension of said resilient member being preferably adjustable as by substitution of the resilient member for one of different tension or the further restricting of the one employed, and the use of this element being optional.

Other objects of our invention will appear from the following description of a preferred embodiment thereof, and from the appended claims, taken in connection with the accompanying drawings, in which—

Fig. 1 is a longitudinal section through a valve of our preferred construction.

Fig. 2 is a transverse section on the line 2—2 of Fig. 1.

Referring in detail to the parts of that specific embodiment of our invention which we have chosen for purposes of illustration, 1 is a tubular body, which may be substituted for an ordinary coupling, this body being shown as internally threaded at both ends, and as provided with an interior shoulder 2. Suitably secured within the front end of the tubular element 1, as by means of exterior threads 3, engaging threads 4 upon the interior of the tubular body 1, we provide a valve seat 5 having apertures 6, and integral with or otherwise supporting a guide pin 7.

To coact with the apertured seat 5 we provide a closure plate 8, this closure plate being shown as provided with a central aperture 9, enabling it to be guided upon the pin 7; and in order yieldably to retain the said closure plate in the position in which it is shown in Fig. 1, we may provide, preferably upon the guide pin 7, resilient returning means such as the spring 10, shown as retained by a washer 11 and a nut 12, adjustable upon the pin 7, a cotter pin 13 being optionally employed as a precaution against accidental separation of parts. The spring may be adjusted by employing a varying number of washers 11 so as to shorten or lengthen the restriction of the spring. Although the pin 7 may be secured to the seat 5 in any suitable way, we have shown these elements as threaded together at 14.

From the foregoing description it will be obvious that, oil or the like being forced in the direction of the arrows 15 and through the apertures 6, the closure plate 8 will be moved away from the valve seat and back pressure upon the plate 8, cooperating with the spring 10, when this is employed, will be immediately effective to close our valve against back pressure, whenever pumping, or the like, is discontinued.

Our improved back pressure valve can be manufactured and sold at a moderate price. It can, moreover, be easily and quickly installed; and it is not liable to easy derangement or subject to early deterioration.

Although we have herein described one preferred embodiment of our invention, it will be understood that various features thereof might be independently employed, and also that various modifications might be made therein without departure from the spirit and scope of our invention as the same is indicated above and in the following claims.

What we claim is:

1. A back pressure valve comprising in combination a pipe coupling having an interior shoulder formed therein, screw threads on the interior of the coupling from the front of the shoulder forming means to screw thread a pipe in the front of the coupling, a peripherally threaded valve seat screwed into said threads against the front of the shoulder, a valve mechanism connected to the valve seat, and means to connect a pipe to the back end of the coupling.

2. A back pressure valve comprising in combination a pipe coupling having an interior shoulder formed therein, screw threads on the interior of the coupling from the front of the shoulder forming means to screw thread a pipe in the front of the coupling, a peripherally threaded valve seat screwed into said threads against the front of the shoulder, seat having apertures therethrough from face to face, a guide pin normal to the seat, a closure plate slidably mounted on the pin adapted to cover and move from said apertures, a coiled compression spring encircling said guide pin adapted to press said closure plate to cause the same to yieldably close the apertures in the said seat, and means to connect a pipe to the back end of the coupling.

3. A back pressure valve comprising in combination a pipe coupling having an interior shoulder formed therein, screw threads on the interior of the coupling, a peripherally threaded valve seat screwed therein into contact with the front face of the shoulder, a pipe screwed into the front end of the coupling, said seat having apertures from face to face, a guide pin normal to said seat, a closure plate slidably mounted on said pin adapted to cover and move from said apertures, a coiled compression spring encircling said guide pin adapted to press said closure plate to cause the same to yieldably close the apertures in the said seat, screw threads on the back of the coupling, and a pipe screw threaded therein.

In testimony whereof we have signed our names to this specification.

HENRY H. HULSEN.
THOMAS A. WILCOX.